US012682542B2

(12) United States Patent
Feng et al.

(10) Patent No.:  US 12,682,542 B2
(45) Date of Patent:       Jul. 14, 2026

(54) TEXTURE SAMPLING METHOD AND APPARATUS BASED ON MERGE PROCESSING OF TEXEL REQUESTS

(71) Applicant: Glenfly Tech Co., Ltd., Shanghai (CN)

(72) Inventors: Jing Feng, Shanghai (CN); Ziwen Zhu, Shanghai (CN); Pengcheng Yu, Shanghai (CN); Lihao Yang, Shanghai (CN)

(73) Assignee: Glenfly Tech Co., Ltd., Shanghai (CN)

( * ) Notice: Subject to any disclaimer, the term of this patent is extended or adjusted under 35 U.S.C. 154(b) by 468 days.

(21) Appl. No.: 18/225,493

(22) Filed: Jul. 24, 2023

(65) Prior Publication Data

US 2024/0127526 A1     Apr. 18, 2024

(30) Foreign Application Priority Data

Oct. 17, 2022    (CN) .......................... 202211265586.5

(51) Int. Cl.
　*G06T 15/04*　　　(2011.01)
　*G06V 10/54*　　　(2022.01)

(52) U.S. Cl.
　CPC .............. *G06T 15/04* (2013.01); *G06V 10/54* (2022.01)

(58) Field of Classification Search
　CPC ................................. G06T 15/04; G06T 1/60
　See application file for complete search history.

(56) References Cited

U.S. PATENT DOCUMENTS 6,353,438 B1　　3/2002　Van Hook
2006/0250408 A1 *　11/2006　Xu ............................ G06T 1/60
　　　　　　　　　　　　　　　　　345/582
2006/0274080 A1　　12/2006　Lee
(Continued)

FOREIGN PATENT DOCUMENTS

CN　　　108022269 A　　5/2018
CN　　　109118422 A　　1/2019
JP　　　2008097451 A　　4/2008

OTHER PUBLICATIONS

Zheng et al. "Design and implementation of a multi-port non-blocking texture Cache." Radio Engineering 48.3 (2018): 198-202 (with English Abstract).
(Continued)

*Primary Examiner* — Phuc N Doan
(74) *Attorney, Agent, or Firm* — Nixon Peabody LLP

(57) ABSTRACT

The present disclosure relates to a texture sampling method and apparatus based on merge processing of texel requests. The present disclosure merges target texel requests in the same cache line together, which reduces the number of cache hit tests. A pressure on the cache of next level to process texel requests may be significantly reduced, and the speed of texture sampling may be increased. The method includes: creating a texture sampling request, where the texture sampling request includes a pixel to be processed; obtaining multiple target texel requests based on pixel coordinates of the pixel to be processed; performing a merge processing on the multiple target texel requests according to a preset rule, and obtaining a merge table of texel requests; sequentially performing cache hit tests on the multiple target texel requests to obtain target texels based on the valid cache lines in the merge table of texel requests.

7 Claims, 4 Drawing Sheets

| Table line id | |
|---|---|
| 1 | Table_cache_tag = 0x1; Table_block_mask = (0001)₂ |
| 2 | Table_cache_tag = 0x0; Table_block_mask = (0000)₂ |
| 3 | Table_cache_tag = 0x0; Table_block_mask = (0000)₂ |
| ... | ... |
| Table_use_mask | (0000_0000_0000_0000_0000_0000_0000_0001)₂ |

Texel 0:
tag = 0x1, block_mask = (0010)₂

| Table line id | |
|---|---|
| 1 | Table_cache_tag = 0x1; Table_block_mask = (0001)₂ |
| 2 | Table_cache_tag = 0x2; Table_block_mask = (0010)₂ |
| 3 | Table_cache_tag = 0x0; Table_block_mask = (0000)₂ |
| ... | ... |
| Table_use_mask | (0000_0000_0000_0000_0000_0000_0000_0011)₂ |

Texel 1:
tag = 0x2, block_mask = (0010)₂

| Table line id | |
|---|---|
| 1 | Table_cache_tag = 0x1; Table_block_mask = (0100)₂ |
| 2 | Table_cache_tag = 0x0; Table_block_mask = (0000)₂ |
| 3 | Table_cache_tag = 0x0; Table_block_mask = (0000)₂ |
| ... | ... |
| Table_use_mask | (0000_0000_0000_0000_0000_0000_0000_0001)₂ |

Texel 2:
tag = 0x1, block_mask = (0100)₂

(56) References Cited

U.S. PATENT DOCUMENTS

| | | | |
|---|---|---|---|
| 2007/0080972 A1* | 4/2007 | Gruber | G06T 15/04 |
| | | | 345/582 |
| 2014/0168245 A1* | 6/2014 | Fahs | G06T 15/005 |
| | | | 345/533 |
| 2014/0240329 A1* | 8/2014 | Tarjan | G06T 15/04 |
| | | | 345/520 |
| 2022/0309732 A1 | 9/2022 | Woo | |

OTHER PUBLICATIONS

Notice of Allowance in Chinese Patent Application No. 202211265586. 5, mailed Nov. 26, 2025 (5 pages).

* cited by examiner

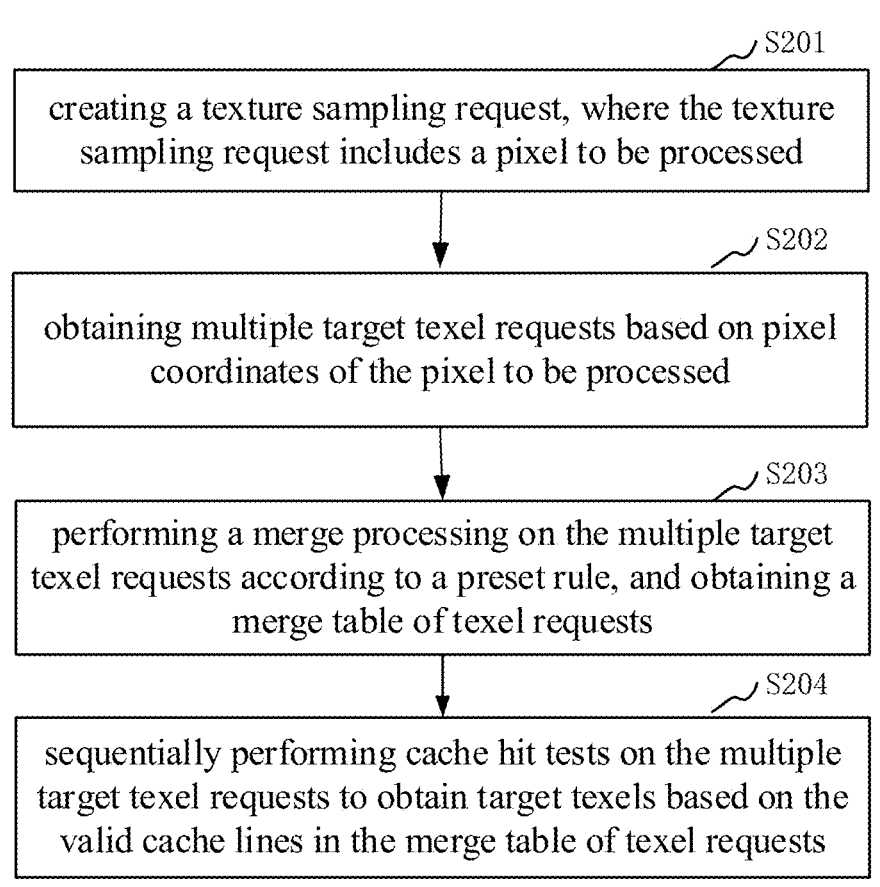

_S201_ creating a texture sampling request, where the texture sampling request includes a pixel to be processed

_S202_ obtaining multiple target texel requests based on pixel coordinates of the pixel to be processed

_S203_ performing a merge processing on the multiple target texel requests according to a preset rule, and obtaining a merge table of texel requests

_S204_ sequentially performing cache hit tests on the multiple target texel requests to obtain target texels based on the valid cache lines in the merge table of texel requests

FIG. 2

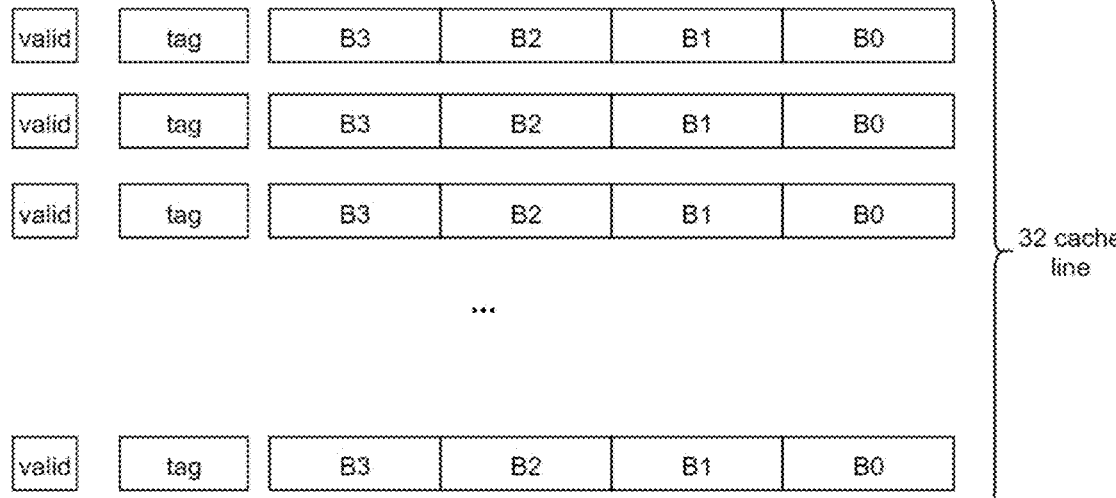

FIG. 3

| Table line ID | |
|---|---|
| 1 | Table_cache tag: a unique tag of cache line；  Table_block_mask: 4bit |
| 2 | Table_cache tag: a unique tag of cache line；  Table_block_mask: 4bit |
| …… | ……. |
| 32 | Table_cache tag: a unique tag of cache line；  Table_block_mask: 4bit |
| Table_use_mask | 32 bit |

1

TEXTURE SAMPLING METHOD AND APPARATUS BASED ON MERGE PROCESSING OF TEXEL REQUESTS

This application claims priority under 35 U.S.C. § 119 to Chinese Patent Application No. 202211265586.5, filed on Oct. 17, 2022, the entire content of which is incorporated herein in its entirety.

TECHNICAL FIELD

The present application relates to the technical field of computer vision technology, and more particularly relates to a texture sampling method and apparatus based on merge processing of texel requests.

BACKGROUND

With the development of computer graphics technology, more stereoscopic and realistic graphics rendering may be achieved by computers through a GPU (Graphic Process Unit, graphics processing unit). Texture Mapping is a technology that draws pictures (maps textures) onto a surface of a 3D scene, which can significantly augment the detail and realism of the scene being rendered.

When the GPU is performing texture mapping, texture pixels (texels in abbreviation) need to be loaded from the memory to a cache, and then texture sampling is performed. The commonly used method for texture sampling is bilinear filtering. Bilinear filtering takes texture coordinates, which correspond to a certain pixel on the 3D scene to be processed, as a center, collects pixel values of 4 texels around the texture coordinates, calculates an average value of the 4 pixel values, and takes the average value as a sampling value. Specifically, in bilinear filtering, 4 texels are required for one sampling, and the smallest working unit of a pixel shader is 2*2 pixel quad, that is 4 pixel blocks. Because 4 texels are needed for each pixel block when the bilinear filtering is performed, 2*2*4=16 texels are required for one mapping, that is, 16 hit tests need to be performed on a texture cache. If cache miss occurs, a request needs to be sent to a cache of next level in order to obtain the texels required by each pixel for texture filtering such that a final sampling result may be obtained.

That is, in existing texture sampling method, one sampling requires 16 texels, and 16 hit tests need to be performed for 16 texels in the cache, that takes 16 clock cycles. In a worst-case scenario, cache miss occurs in each hit test. In this case, 16 miss requests are sent to a cache of next level, and then the cache of next level returns data in response to the miss requests one by one. In view of the above, the existing sampling method consumes relatively long time and adversely affects efficiency of texture sampling.

SUMMARY

In view of the defects existing in the prior art mentioned above, a texture sampling method and apparatus based on merge processing of texel requests are provided.

In a first aspect, a texture sampling method based on merge processing of texel requests is provided. The method includes the following:

creating a texture sampling request, where the texture sampling request includes a pixel to be processed;

obtaining multiple target texel requests based on pixel coordinates of the pixel to be processed;

2 performing a merge processing on the multiple target texel requests according to a preset rule, and obtaining a merge table of texel requests;

sequentially performing cache hit tests on the multiple target texel requests to obtain target texels based on the valid cache lines in the merge table of texel requests.

In one of the embodiments, the obtaining multiple target texel requests based on pixel coordinates of the pixel to be processed includes the following.

calculating texel coordinates of multiple target texels corresponding to the pixel coordinates based on the pixel coordinates;

creating target texel requests based on the texel coordinates, where each target texel request includes one target texel;

In one of the embodiments, the merge table of texel requests includes a cache line tag and a block mask of a to-be-requested cache of next level; the sequentially performing cache hit tests on the multiple target texel requests to obtain target texels based on the valid cache lines in the merge table of texel requests includes the following:

calculating a texel tag of a target texel in each target texel request;

writing the multiple target texel requests into the merge table of texel requests based on a comparison result of the texel tags and the cache line tag.

In one of the embodiments, the merge table of texel requests further includes the to-be-requested cache of next level; the writing multiple target texel requests into the merge table of texel requests based on a comparison result of texel tags and the cache line tag includes the following.

based on the comparison result, if the texel tag already exists in the merge table of texel requests, performing an OR operation on a cache block mask corresponding to the texel tag with the block mask of the to-be-requested cache of next level, so that the target texel is written into the merge table of texel requests.

In one of the embodiments, the merge table of texel requests further includes the to-be-requested cache of next level; the writing multiple target texel requests into the merge table of texel requests based on a comparison result of texel tags and the cache line tag includes the following.

if the texel tag does not exist in the merge table of texel requests, writing the cache block mask corresponding to the texel tag into a new cache line and updating the merge table of texel requests.

In one of the embodiments, sequentially performing cache hit tests on the multiple target texel requests to obtain target texels based on the valid cache lines in the merge table of texel requests includes the following.

taking cache lines, which correspond to texel tags containing target texels, as valid cache lines; sequentially performing hit tests on the valid cache lines; if a hit test is successful, obtaining a target texel.

In one of the embodiments, the method further includes the following.

if a miss occurs, sending a cache block mask, which corresponds to a texel tag containing the target texel, to a cache space of next level for further hit test.

In one of the embodiment, the texel tag is used to identify a texel

In one of the embodiment, the cache line tag is used to uniquely identify one cache line.

In a second aspect, a texture sampling apparatus based on merge processing of texel requests is provided by the present disclosure. The apparatus includes the following.

a texture sampling request creation module, which is configured to create a texture sampling request, where the texture sampling request includes a pixel to be processed;

a target texel request acquisition module, which is configured to obtain multiple target texel requests based on pixel coordinates of the pixel to be processed;

a merge table for texel requests processing module, which is configured to perform a merge processing on the multiple target texel requests according to a preset rule, and obtaining a merge table of texel requests;

a hit test module, which is configured to sequentially perform cache hit tests on the multiple target texel requests to obtain target texels based on the valid cache lines in the merge table of texel requests.

The above-mentioned texture sampling method, apparatus, computer device and storage medium based on fusion processing of texel requests create a texture sampling request, where the texture sampling request includes a pixel to be processed; obtaining multiple target texel requests based on pixel coordinates of the pixel to be processed; performing a merge processing on the multiple target texel requests according to a preset rule, and obtaining a merge table of texel requests; sequentially performing cache hit tests on the multiple target texel requests to obtain target texels based on the valid cache lines in the merge table of texel requests. The present disclosure, by creating and updating the merge table of texel requests, target texel requests in the same cache line are merged together, which reduces the number of cache hit tests. At the same time, after performing the merge operation on a large quantity of continuous target texel requests, a pressure on the cache of next level to process texel requests may be significantly reduced, and the speed of texture sampling may be increased.

BRIEF DESCRIPTION OF THE DRAWINGS

FIG. 2 is schematic flow chart of a texture sampling method based on merge processing of texel requests according to an embodiment;

FIG. 3 is an organizational structure diagram of a cache space according to an embodiment;

DETAILED DESCRIPTION OF THE EMBODIMENTS

In order to make the objectives, technical solutions and advantages of the present disclosure clearer, the present disclosure is described in further detail below in conjunction with the accompanying drawings and embodiments. It should be understood that particular embodiments described herein are intended only to interpret the present disclosure and not intended to limit the present disclosure.

Figure 1:
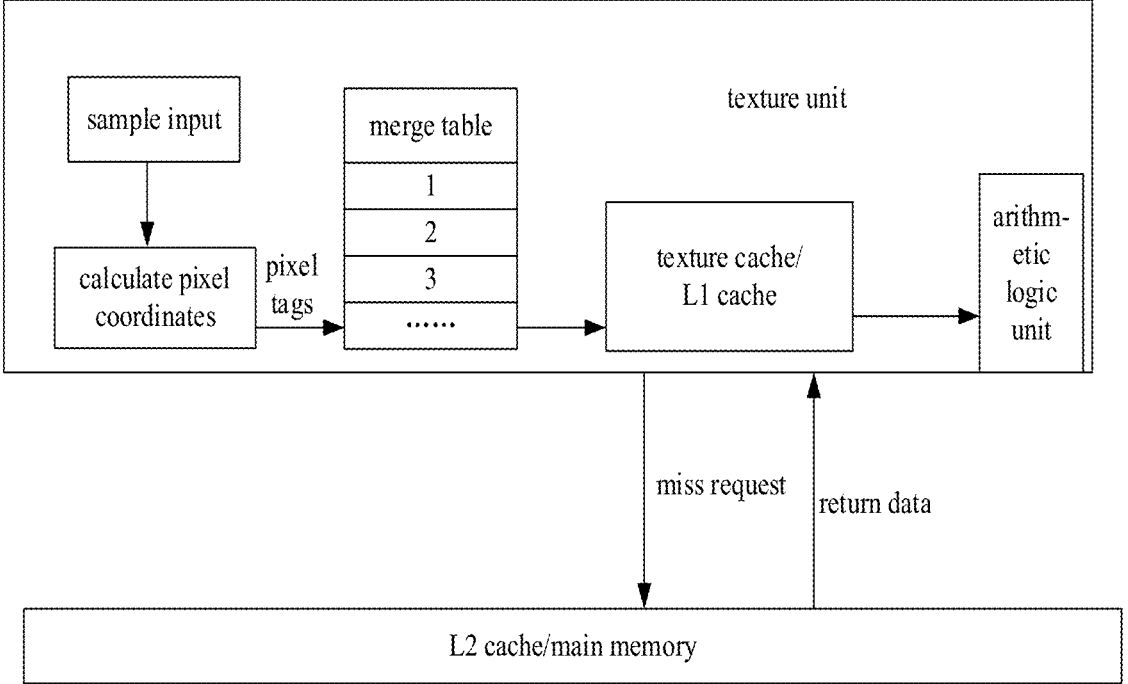
FIG. 1 is a diagram of an organizational architecture for a texture sampling method based on merge processing of texel requests according to an embodiment.

A texture sampling method based on merge processing of texel requests provided by an embodiment of the present disclosure may be applied to a Graphic Process Unit (GPU). The GPU may include multiple processor cores, and each core can serve as a texture unit. Each texture unit includes an arithmetic logic unit (ALU), a texture cache and a merge table of texel requests. The texture cache is essentially an L1 cache. When the GPU is performing texture mapping, texture pixels (texels in abbreviation) need to be loaded from a memory to the L1 cache (which is the above-mentioned texture cache), and then texture sampling is performed. A commonly used method for texture sampling is bilinear filtering. Bilinear filtering takes texture coordinates, which correspond to a certain pixel on a 3D scene to be processed, as a center, collects pixel values of 4 texels around the texture coordinates, calculates an average value of the 4 pixel values, and takes the average value as a sampling value. Specifically, in bilinear filtering, 4 texels are required for one sampling, and a smallest working unit of a pixel shader is 2*2 pixel quad, that is 4 pixel blocks. Because 4 texels are needed for each pixel block when the bilinear filtering is performed, 2*2*4=16 texels are required for one mapping, that is, 16 hit tests need to be performed on the texture cache. If cache miss occurs, a request needs to be sent to a cache of next level (an L2 cache or a main memory in FIG. 1) in order to obtain the texels required by each pixel for texture filtering such that a final sampling result may be obtained.

In an embodiment, as shown in FIG. 2, a texture sampling method based on merge processing of texel requests is provided. As an example for illustration, the texture sampling method is applied to a texture unit in FIG. 1, which includes steps as follows.

Step S201 includes: creating a texture sampling request, where the texture sampling request includes a pixel to be processed.

Texture, in computer graphics, not only includes a commonly acknowledged texture of an object surface, i.e., grooves that make the object surface appear uneven, but also includes colorful images on a smooth surface of an object, which are usually called patterns. Texture sampling is an important step in texture mapping. A texture sampling request refers to a texture sampling request regarding a target scene; that is, regarding a target scene to be created (currently a 2D picture), a certain area needs to be textured. Specifically, in response to a user operation of selecting a target area, a texture sampling request may be created for the target area.

Specifically, regarding a target scene to be created (currently a 2D picture), a certain area needs to be textured. For example, in response to a user operation of selecting a target area, a texture sampling request is created for the target area. The target area includes multiple pixels to be processed.

Step S202 includes: obtaining multiple target texel requests based on pixel coordinates of the pixel to be processed.

Specifically, a bilinear filtering method (a texture sampling method) is taken as an example for illustration. In the bilinear filtering method, texture coordinates, which correspond to a certain pixel on the 3D scene to be processed, are treated as a center, where the texture coordinates are corresponding coordinates, in a texture space, of the pixel transformed into the texture space; then pixel values of 4 texels around the texture coordinates are collected, and an average value of the 4 pixel values are calculated and used as a sampling value. Specifically, in bilinear filtering, 4 texels are required for one sampling, and a smallest working unit of a pixel shader is 2*2 pixel quad, that is 4 pixel blocks. Because 4 texels are needed for each pixel block when the bilinear filtering is performed, one mapping requires 2*2*4=16 texels. Therefore, for a texel sampling of one pixel to be processed, 16 target texel requests need to be created.

Step S203 includes: performing a merge processing on the multiple target texel requests according to a preset rule, and obtaining a merge table of texel requests.

A structure of a texture cache is first introduced. The texture cache is the L1 cache in FIG. 1. As shown in FIG. 3, a size of a cache line of the texture cache and a minimum data transfer unit (block) between the texture cache and a cache of next level are determined by designer. A relationship therebetween is that: cache line size=n*block size, where n is an integer; that is, the size of the cache line is an integer multiple of the block size. Texels required by pixel quad (pixel blocks) may be in different blocks of one cache line, and multiple times of block requests are required. Hit test on the cache is performed for each of the 16 texels required by a 2*2 pixel quad, meaning that 16 hit tests are required. When a miss occurs, a request is sent to the cache of next level. An example is provided based on a set-associative cache. Assuming that a texture cache has a capacity of 4 KB, cache line size of 128 byte, and block size of 32 byte, and there are 32 cache lines in total. Since cache line size=128 byte=4*32 byte, one cache line is composed of 4 blocks, recorded as B0~B3. Because the cache of next level returns 1 block of data each time, each cache line uses a 4-bit block mask to record which block(s) in the cache line is(are) currently required. For example, block mask=0x1= (0001) 2 indicates to request B0, block mask=0x5=(0101) 2 indicates to request B0 and B2. 16 hit tests are performed in a cache control for the 16 texels, which require 16 cycles. In a worst case scenario, cache miss occurs in each hit test. In this case, 16 miss requests are sent to the cache of next level, then the cache of next level returns data in response to the miss requests one by one, consuming relatively long time and adversely affecting efficiency of texture sampling.

Specifically, in Step S203, before each target texel request enters the texture cache for a hit, a merge operation is first performed on all target texel requests (16 texel requests in total) of a current sampling, that is, a merge operation is performed on block masks of multiple target texel requests located in the same cache line, which leads to form a request set for hit test. Because the probability is high for texels which are required by a pixel quad to have adjacent addresses with one another in the texture, that is, there is a high probability that these texels are in the same cache line, and these texels may be in the same block or in different blocks; this provides a basis for request merge. Therefore, in this disclosure, all the above-mentioned target texel requests are organized into a table, that is, a merge table of texel requests. In a later stage, multiple simultaneous hits of target texel requests can be realized by querying valid cache lines in the table.

In step S204, based on the valid cache lines in the merge table of texel requests, cache hit tests on the multiple target texel requests are sequentially performed to obtain target texels.

Specifically, based on valid cache lines in the merge table of texel requests, cache hit tests are performed on the multiple target texel requests in sequence. Because the probability is high for the texels which are required by a pixel quad to have adjacent addresses with one another in the texture, that is, there is a high probability that these texels are in the same cache line, and these texels may be in the same block or in different blocks, performing line-by-line hit tests according to sorted valid cache lines in the merge table of texel requests may reduce a number of hit tests, and increase a speed of texture sampling.

In the above embodiment, by creating and updating the merge table of texel requests, target texel requests in the same cache line are merged together, which reduces the number of cache hit tests. At the same time, after performing the merge operation on a large quantity of continuous target texel requests, a pressure on the cache of next level to process texel requests may be significantly reduced, and the speed of texture sampling may be increased.

In an embodiment, the above-mentioned step S202 includes: calculating texel coordinates of multiple target texels corresponding to the pixel coordinates based on the pixel coordinates, and creating target texel requests based on the texel coordinates, where each target texel request includes one target texel.

The texel coordinates refer to coordinates of a position of each texel in a texture space.

Specifically, a bilinear filtering method (a texture sampling method) is taken as an example for illustration. In the bilinear filtering, texture coordinates, which correspond to a certain pixel on the 3D scene to be processed, are treated as a center, where the texture coordinates are corresponding coordinates, in a texture space, of the pixel transformed into the texture space; then pixel values of 4 texels around the texture coordinates are collected, and an average value of the 4 pixel values are calculated and used as a sampling value. Specifically, in bilinear filtering, 4 texels are required for one sampling, and a smallest working unit of a pixel shader is 2*2 pixel quad, that is 4 pixel blocks. Because 4 texels are needed for each pixel block when the bilinear filtering is performed, one mapping requires 2*2*4=16 texels. Therefore, for a texel sampling of one pixel to be processed, 16 target texel requests may be obtained.

In the above-mentioned embodiment, the texel coordinates of multiple target texels are calculated through the pixel coordinates, and corresponding target texel requests are created to provide a calculation basis for subsequent merge processing.

In an embodiment, the above-mentioned merge table of texel requests includes a cache line tag and a block mask of a to-be-requested cache of next level. The above-mentioned step S203 includes: calculating a texel tag of a target texel in each target texel request; based on a comparison result of texel tags and the cache line tag, writing multiple target texel requests into the merge table of texel requests.

The texel tag is used to identify one texel. The cache line tag is used to uniquely identify one cache line.

Figures 4, 5:
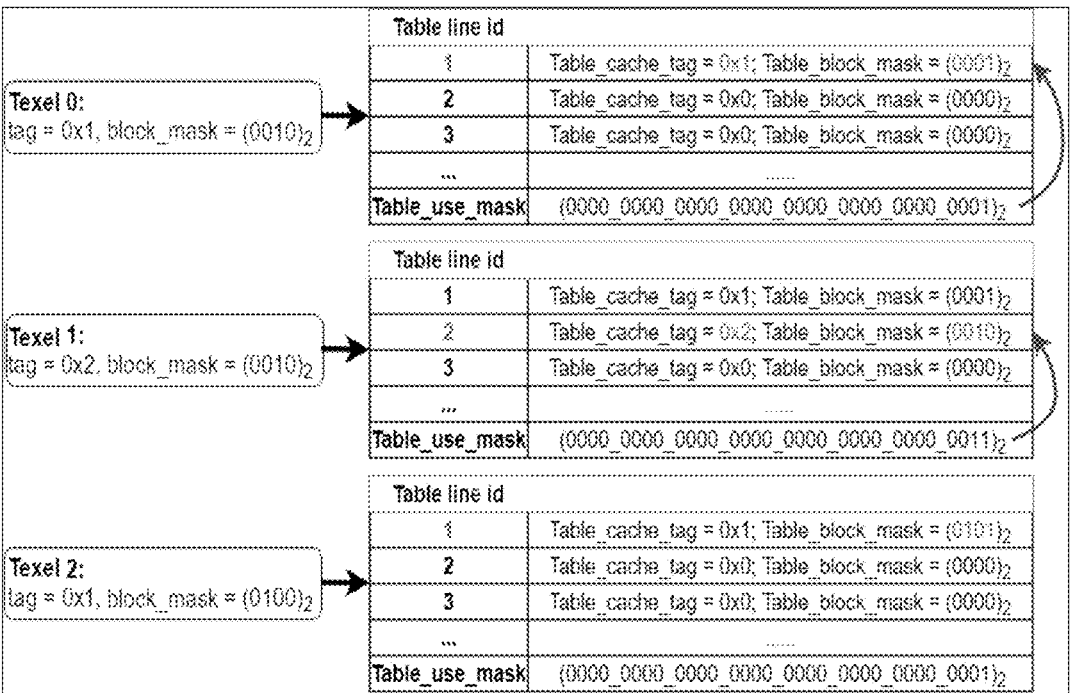
FIG. 4 is a schematic structural diagram of a merge table of texel requests according to an embodiment.
FIG. 5 is a diagram illustrating an application example of a merge table of texel requests according to an embodiment.

Specifically, as shown in FIG. 4, a table needs to be maintained to implement request merge in an embodiment. The number of lines of the table is the same as the number of cache lines. The number of lines is set to be n=32, and a 32 bits table_use_mask is additionally needed to indicate which lines in the table contain valid data. Each line of the table represents information of one cache line, which includes two values that are a tag and a block_mask, where the block_mask indicates the number of block(s) in the cache line to be requested from the cache of next level, and the block_mask is 4 bits in total. Consequently, the above-mentioned step S203 includes: obtaining a tag of each texel added into the table; comparing the tag of the texel with a valid table line in the table according to the table_use_mask, to determine if the tag already exists in the table; if the tag exists, updating a corresponding block mask; if the tag does not exist, writing the target texel request into a new cache line in the table.

In the above-mentioned embodiment, by creating a merge table of texel requests and writing target texel tags, which correspond to multiple target texel requests, into the table, favorable conditions are provided to subsequently improve the hit rate of hit test as the texels around the same pixel are very likely to be in the same block or the same line.

In an embodiment, the above-mentioned merge table of texel requests further includes a block mask of a to-be-requested cache of next level; the above-mentioned step S203 also includes: based on a comparison result, if a texel tag already exists in the merge table of texel requests, performing an OR operation on a cache block mask corresponding to the texel tag with the block mask of the to-be-requested cache of next level, so that the target texel is written into the merge table of texel requests; if the texel tag does not exist in the merge table of texel requests, writing the cache block mask corresponding to the texel tag into a new cache line and updating the merge table of texel requests.

Specifically, detailed processes of request merge are as follows.

1) For each texel written in the table, a tag of the texel is obtained. The tag is compared with a valid table line in the table according to table_use_mask to determine whether the tag already exists in the table.

2) If the tag already exists, an OR operation is performed on the block_mask of the new texel with an existing table_block_mask in the table, and the texel is written into the table.

3) If the tag does not exist, a new line in the table is occupied, block_mask of the texel is written into the new line, and table_use_mask is updated.

4) The above-mentioned processes are repeated to add a next texel request into the table.

As shown in FIG. 5, a detailed example is demonstrated as follows.

Texel 0: Since the table is empty, it means that table_use_mask=0x0. Occupy a line of the table with table_line_id=1. Assume cache tag and block_mask of Texel 0 are cache tag=0x1, block_mask=(0001)2, and update table_use_mask=0x1.

Texel 1: Assume tag and block_mask of Texel 1 are tag=0x2, block_mask=(0010)2; since table_use_mask=0x1, that is, the texel only needs to be compared with a content of table line with table_line_id=1. Since texel_tag=0x2≠table_cache tag[1], a merge operation can not be performed. For this texel 1, a new line in the table may be occupied. Update the following: table_line_id=2, table_cache tag[2]=0x2, table_block_mask[2]=(0010)2, table_use_mask=0x3.

Texel 2: Assume tag and block_mask of Texel 2 are tag=0x1, block_mask=(0100)2, and compare the tag with a content of a valid line in the table; it is found that the tag is the same as a tag of table_line_id=1, the texel 2 is merged into this line, where table_block_mask[1]=(0001)21(0100)2=(0101)2, and table_use_mask remains unchanged.

Other texels are sequentially written into the table.

In the above-mentioned embodiment, by maintaining and updating the merge table of texel requests, favorable conditions are provided to subsequently improve the hit rate of hit test.

In an embodiment, the above-mentioned step S204 includes: cache lines, which correspond to texel tags containing target texels, are taken as valid cache lines; hit tests are sequentially performed on the valid cache lines; if a hit test is successful, a target texel is obtained; if a miss occurs, a cache block mask, which corresponds to a texel tag containing a target texel, is sent to a cache space of next level for further hit test.

Specifically, a merge table is obtained by merging 16 texel requests. The number of valid lines in the table is the number of hit tests performed for a cache. Hit tests are performed on the valid cache lines in the table in sequence, and if cache miss occurs in a table line, a request is sent to a cache of next level. Since quad texels are very likely to be in the same cache line, or even in the same block, the number of hit tests for texel requests after merging may be reduced, and the number of requests sent to the cache of next level may also be reduced. As shown in FIG. 5, three texels are taken as an example. If hit tests directly take place in the cache without a merge preprocessing on original texel requests according to the present disclosure, three hit tests are required to be performed for three texels. If all hit tests miss, three requests need to be sent; however, according to the method of the present disclosure, only two hit tests need to be performed in the cache, and only two requests need to be sent when all hit tests miss.

In the above-mentioned embodiment, by performing hit tests on sorted target texel requests, the hit test can be performed in units of lines since consecutive target texels are likely to be in the same cache line. This may greatly reduce a number of tests, while increasing a texel sampling speed.

It is to be understood that, although steps in the flow charts involved in the above-mentioned embodiments are displayed in sequence based on indication of arrows, these steps are not necessarily executed sequentially based on the sequence indicated by the arrows. Unless otherwise explicitly specified herein, sequence to execute the steps is not strictly limited, and the steps may be executed in other sequences. In addition, at least some steps in in the flow charts involved in the above-mentioned embodiments may include multiple steps or multiple stages, and these steps or stages are not necessarily executed at the same moment, but may be executed at different moments. These steps or stages are not necessarily executed in sequence, but may be executed in turn or alternately with another step or at least a part of steps or stages of another step.

Based on a same inventive concept, an embodiment of the present disclosure further provides a texture sampling apparatus based on merge processing of texel requests to implement the above-mentioned texture sampling method based on merge processing of texel requests. The implementation solution to the problem provided by the apparatus is similar to the implementation solution described in the above-mentioned method. Therefore, specific limitations of one or more embodiments of the texture sampling apparatus based on merge processing of texel requests provided below may be referred to the limitation of the above-mentioned texture sampling method based on merge processing of texel requests, hence are not to be repeated herein.

Figure 6:
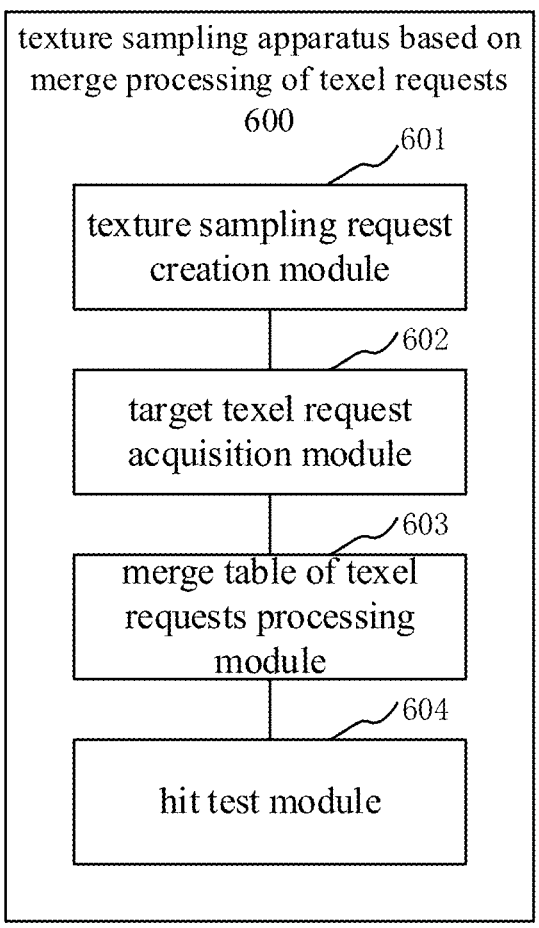
FIG. 6 is a structural block diagram of a texture sampling apparatus based on merge processing of texel requests according to an embodiment.

In an embodiment, as shown in FIG. 6, a texture sampling apparatus based on merge processing of texel requests 600 is provided, which includes: a texture sampling request creation module 601, a target texel request acquisition module 602, a merge table of texel requests processing module 603 and a hit test module 604.

The texture sampling request creation module 601 is configured to create a texture sampling request, where the texture sampling request includes a pixel to be processed.

The target texel request acquisition module 602 is configured to obtain multiple target texel requests based on pixel coordinates of the pixel to be processed.

The merge table of texel requests processing module 603 is configured to perform a merge processing on the multiple target texel requests according to a preset rule, and obtaining a merge table of texel requests.

The hit test module 604 is configured to sequentially perform cache hit tests on the multiple target texel requests to obtain target texels based on the valid cache lines in the merge table of texel requests.

In accordance with one of the embodiments, the above-mentioned target texel request acquisition module 602 is further configured to perform the following: calculating texel coordinates of multiple target texels corresponding to the pixel coordinates based on the pixel coordinates, and creating target texel requests based on the texel coordinates, where each target texel request includes one target texel.

In accordance with one of the embodiments, the texel request merge table includes a cache line tag and a block mask of a to-be-requested cache of next level; the above-mentioned merge table of texel requests processing module 603 is further configured to perform the following: calculating a texel tag of a target texel in each target texel request; based on a comparison result of texel tags and the cache line tag, writing multiple target texel requests into the merge table of texel requests.

In accordance with one of the embodiments, the merge table of texel requests further includes a block mask of a to-be-requested cache of next level; the above-mentioned merge table of texel requests processing module 603 is further configured to perform the following: based on a comparison result, if a texel tag already exists in the merge table of texel requests, performing an OR operation on a cache block mask corresponding to the texel tag with the block mask of the to-be-requested cache of next level, so that the target texel is written into the merge table of texel requests.

In accordance with one of the embodiments, the above-mentioned texel request merge table processing module 603 is further configured to perform the following: if the texel tag does not exist in the merge table of texel requests, writing the cache block mask corresponding to the texel tag into a new cache line and updating the merge table of texel requests.

In accordance with one of the embodiments, the above-mentioned hit test module 604 is further configured to perform the following: cache lines, which correspond to texel tags containing target texels, are taken as valid cache lines; hit tests are sequentially performed on the valid cache lines; hit tests are sequentially performed on the valid cache lines; if a hit test is successful, a target texel is obtained.

In accordance with one of the embodiments, the hit test module 604 is further configured to perform the following: if a miss occurs, a cache block mask, which corresponds to a texel tag containing a target texel, is sent to a cache space of next level for further hit test.

Each module in the above-mentioned texture sampling apparatus based on merge processing of texel requests may be implemented in whole or in part by software, hardware, and a combination of hardware and software. The above-mentioned each module can be embedded in the form of hardware in a processor, or be independent from a processor in a computer device, or be stored in the form of software in a memory of a computer device, so as to make it easier for the processor to call and execute an operation corresponding to each module.

In one embodiment, a computer device is provided, which includes a memory and a processor. The memory is used to store a computer program, and the processor implements all steps in the embodiments of the texture sampling method based on merge processing of texel requests when executing the computer program.

In one embodiment, a computer readable storage medium is provided, storing therein a computer program which is executed by a processor to implement all steps in the embodiments of the texture sampling method based on merge processing of texel requests.

It should be noted that, user information involved in the present disclosure (including, but not limited to, user device information, user personal information, and the like) and data (including, but not limited to, analyzed data, stored data, displayed data, and the like) refers to information and data which are authorized by the user or by all parties.

A person of ordinary skill in the art may understand that all or some of the above-mentioned embodiments may be implemented by a computer program instructing relevant hardware. The computer program may be stored in a non-volatile computer readable storage medium. When the computer program is executed, the execution may include embodiments of the above-mentioned methods. Any references to a memory, a database, or another medium used in the various embodiments provided in the disclosure may include at least one of a non-volatile and a volatile memory. The nonvolatile Memory may include Read-Only Memory (ROM), magnetic tape, floppy disk, flash memory, optical memory, high-density embedded nonvolatile memory, Resistive Random Access Memory (ReRAM), Magnetic Random Access Memory (MRAM), Ferroelectric Random Access Memory (FRAM), Phase Change Memory (PCM), graphene memory, and the like. Volatile memory may include Random Access Memory (RAM), external cache memory, and the like. By way of illustration and not limitation, RAM may take many forms, such as Static Random Access Memory (SRAM) or Dynamic Random Access Memory (DRAM), among others. The databases referred in various embodiments provided herein may include at least one of relational and non-relational databases. The non-relational database may include, but is not limited to, a block chain based distributed database, and the like. The processors referred in the embodiments provided herein may be, but is not limited to, general purpose processors, central processing units, graphics processors, digital signal processors, programmable logic apparatus, quantum computing based data processing logic apparatus, and the like.

Technical features of the above-mentioned embodiments may be freely combined. To be brief in description, not all possible combinations of the technical features in the above-mentioned embodiments are described. However, the combinations of these technical features should be considered to fall within the scope of this specification as long as these combinations are not contradictory.

The above-mentioned embodiments only represent several embodiments of this disclosure, and their descriptions are specific and detailed, but should not be understood as limiting the scope of this disclosure. It should be noted that, several modifications and improvements can be made by those of ordinary skill in the art without departing from the concept of this disclosure, which belong to the protection scope of this disclosure. Therefore, it is intended that the protection scope of this disclosure shall be subjected to the appended claims.

What is claimed:

1. A texture sampling method based on merge processing of texel requests, comprising:

creating a texture sampling request, where the texture sampling request includes a pixel to be processed;

obtaining a plurality of target texel requests based on pixel coordinates of the pixel to be processed;

performing a merge processing on the plurality of target texel requests according to a preset rule, and obtaining a merge table of texel requests;

sequentially performing cache hit tests on the plurality of target texel requests to obtain target texels based on the valid cache lines in the merge table of texel requests;

the merge table of texel requests comprises a cache line tag and a block mask of a to-be-requested cache of next level; the sequentially performing cache hit tests on the plurality of target texel requests to obtain target texels based on the valid cache lines in the merge table of texel requests comprises:

calculating a texel tag of a target texel in each target texel request; and writing the plurality of target texel requests into the merge table of texelrequests based on a comparison result of the texel tags and the cache line tag;

where in the merge table of texel requests further comprises the to-be-requested cache of next level; the writing the plurality of target texel requests into the merge table of texel requests based on a comparison result of the texel tags and the cache line tag comprises:

based on the comparison result, if the texel tag already exists in the merge table of texel requests, performing an OR operation on a cache block mask corresponding to the texel tag with the block mask of the to-be-requested cache of next level, so that the target texel is written into the merge table of texel requests; and wherein the writing a plurality of target texel requests into the merge table of texel requests based on a comparison result of texel tags and the cache line tag further comprises:

if the texel tag does not exist in the merge table of texel requests, writing the cache block mask corresponding to the texel tag into a new cache line and updating the merge table of texel requests.

2. The method of claim 1, wherein the obtaining a plurality of target texel requests based on pixel coordinates of the pixel to be processed comprises:

calculating texel coordinates of a plurality of target texels corresponding to the pixel coordinates based on the pixel coordinates; and creating target texel requests based on the texel coordinates, where each target texel request includes one target texel.

3. The method of claim 1, wherein sequentially performing cache hit tests on the plurality of target texel requests to obtain target texels based on the valid cache lines in the merge table of texel requests comprises:

taking cache lines, which correspond to texel tags containing target texels, as valid cache lines; sequentially performing hit tests on the valid cache lines; if a hit test is successful, obtaining a target texel.

4. The method of claim 3, wherein the method further comprises:

if a miss occurs, sending a cache block mask, which corresponds to a texel tag containing the target texel, to a cache space of next level for further hit test.

5. The method of claim 1, wherein the texel tag is used to identify a texel.

6. The method of claim 1, wherein the cache line tag is used to uniquely identify one cache line.

7. A texture sampling apparatus based on merge processing of texel requests, comprising:

a texture sampling request creation module, which is configured to create a texture sampling request, where the texture sampling request includes a pixel to be processed;

a target texel request acquisition module, which is configured to obtain a plurality of target texel requests based on pixel coordinates of the pixel to be processed;

a merge table of texel requests processing module, which is configured to perform a merge processing on the plurality of target texel requests according to a preset rule, and obtaining a merge table of texel requests; and a hit test module, which is configured to sequentially perform cache hit tests on the plurality of target texel requests to obtain target texels based on the valid cache lines in the merge table of texel requests;

the merge table of texel requests comprises a cache line tag and a block mask of a to-be-requested cache of next level; the sequentially performing cache hit tests on the plurality of target texel requests to obtain target texels based on the valid cache lines in the merge table of texel requests comprises:

calculating a texel tag of a target texel in each target texel request; and writing the plurality of target texel requests into the merge table of texel requests based on a comparison result of the texel tags and the cache line tag;

wherein the merge table of texel requests further comprises the to-be-requested cache of next level; the writing the plurality of target texel requests into the merge table of texel requests based on a comparison result of the texel tags and the cache line tag comprises:

based on the comparison result, if the texel tag already exists in the merge table of texel requests, performing an OR operation on a cache block mask corresponding to the texel tag with the block mask of the to-be-requested cache of next level, so that the target texel is written into the merge table of texel requests; and wherein the writing a plurality of target texel requests into the merge table of texel requests based on a comparison result of texel tags and the cache line tag further comprises:

if the texel tag does not exist in the merge table of texel requests, writing the cache block mask corresponding to the texel tag into a new cache line and updating the merge table of texel requests.

* * * * *